United States Patent [19]
Honigman

[11] 3,840,267
[45] Oct. 8, 1974

[54] EXPANDABLE VEHICLE STRUCTURE
[75] Inventor: Michael L. Honigman, Los Angeles, Calif.
[73] Assignee: Elm Design, Inc., Los Angeles, Calif.
[22] Filed: July 7, 1972
[21] Appl. No.: 269,530

Related U.S. Application Data
[63] Continuation-in-part of Ser. No. 64,476, Aug. 17, 1970, abandoned.

[52] U.S. Cl. .................. 296/23 F, 296/27, 52/64
[51] Int. Cl. ............................................. B60p 3/34
[58] Field of Search ...... 52/64; 296/23 R, 27, 23 D, 296/23 E, 23 F, 23 G

[56] References Cited
UNITED STATES PATENTS
2,907,077  10/1959  Pugsley .................. 296/23 R X
3,521,926  7/1970   Brewin ......................... 296/27
FOREIGN PATENTS OR APPLICATIONS
932,458   11/1947  France ..................... 296/23 F
215,582   7/1957   Australia ....................... 52/64

Primary Examiner—Philip Goodman
Attorney, Agent, or Firm—Henry M. Bissell

[57] ABSTRACT

A box-like expandable unit adapted to cover the fixed, movable space of a trailer, camper, or other vehicle or structure or the like. The box-like top unit is of generally parallelepiped shape and capable of being slid over its open-top bottom unit, rotated through 90° and positioned vertically thereto. From one end of the top unit a roof portion, side walls and a rear wall may be unfolded to provide a habitable front space. Similarly from the other end of the top unit a floor, roof, side walls and rear walls may be unfolded to provide a habitable rear space. The structure may be opened to more than twice as long as the original unit. The top unit may also be mounted on top of a camper, a panel truck or mini-bus. Also the expandable unit may be used by itself and mounted against the wall of a building to provide an enclosed, habitable patio structure or extra room or used separately to provide a complete, separate space enclosure when expanded.

30 Claims, 25 Drawing Figures

INVENTOR.
MICHAEL L. HONIGMAN
BY Henry M. Bissell
ATTORNEY

INVENTOR.
MICHAEL L. HONIGMAN
BY
Henry M. Bissell
ATTORNEY

EXPANDABLE VEHICLE STRUCTURE

BACKGROUND OF THE INVENTION

1. Field of the Invention

This invention relates generally to expandable, habitable structures, and more particularly to such a foldable structure suitable for use with campers, trailers and the like. This application is a continuation-in-part of copending U.S. Pat. application Ser. No. 64,476, filed Aug. 17, 1970, now abandoned.

2. Description of the Prior Art

In recent years the use of campers and trailers has become more widespread. In particular there is an increasing demand for such campers or trailers which are large enough to accommodate spacious living quarters for entire families. On the other hand, the use of very large campers or even of large trailers is restricted due to their large and considerable weight which make it hard to move or pull them over narrow or winding roads. They are a danger to traffic during high winds or when moving over mountain roads.

These and other problems are solved by the use of a compact structure which may be expanded on a chosen site with a minimum of effort and equipment. Accrdingly, various proposals have been made to provide collapsible trailers and similar structures. For example, one such trailer consists of a plurality of sections which are made to telescope; alternatively telescopically connected sections may be used. Portable buildings have also been proposed having a roof which is to be hoisted by cables, while the walls are inserted after the roof is erected. Such a structure is too cumbersome for a movable vehicle and requires too much effort, time, and equipment to erect by the average person.

A folding house trailer has been suggested having split and hinged walls with a gable roof. Again this construction is somewhat difficult to erect because it consists of too many folded parts which must be moved and locked to each other. Another structure provides for a vehicular enclosure where the walls slide around for expansion. To this end the roof and two walls must be moved simultaneously in two different directions perpendicular to each other which may require several persons to erect or expand the structure. Also a collapsible roof for automobiles has been devised to provide a larger head room. Here the finished roof structure is wedge-shaped and yields little extra habitable space.

It is, accordingly, an object of the present invention to provide an expandable, habitable space suitable for campers, trailers, panel vehicles and the like which will permit extension of the enclosed space to over twice the length of the trailer or the like.

Another object of the invention is to provide a box-like structure which may be mounted on top of a trailer or camper and which may be slid off the top, rotated through 90° and positioned vertically contiguous to and locked to the trailer of camper unit.

A further object of the invention is to provide a structure of the type referred to of generally parallelepiped shape capable of containing, in a folded condition, roof, side walls, and front wall of a front compartment as well as floor, side walls, roof and rear wall of a rear compartment which may be unfolded to provide a relatively large habitable space.

A particular object of the invention is to provide a low cost expandable unit of the type described in which the expandable enclosure portions are constructed mainly of canvas of the like.

It is another object of the invention to provide a relatively large camping structure which may be collapsed to a particularly compact unit for transporting.

SUMMARY OF THE INVENTION

In accordance with a preferred embodiment of the invention there is provided a movable habitable space enclosure capable of being expanded to more than twice its collapsed, transportable volume with a minimum of time and effort. The entire structure includes a bottom unit and an expandable top unit. The bottom unit has a floor and fixed side walls. This may contain built-in appliances and serves as the kitchen portion of the expanded unit. Also wheels are provided on the bottom unit in the case of a trailer, or the bottom unit is attached to a truck chassis or box in the case of a camper.

The expandable top unit is of generally box-like or parallelepiped shape and is slidably disposed on and covers the bottom unit before it is expanded. It is adapted to slide over the bottom unit and to be rotated through 90° until it is disposed vertically contiguous to the bottom unit. One end of the top unit contains a front roof portion, front side walls and a front wall portion foldably disposed in the top unit. These parts, when unfolded, substantially cover and enclose the bottom unit to form an enclosed, habitable front portion or compartment.

The other end of the top unit contains a floor, a rear roof portion, rear side walls and a rear wall portion also foldably disposed in the top unit. These parts enclose a space to form an enclosed habitable rear portion or compartment adjacent to and interconnected with the front compartment by the common side wall. These two habitable portions have a combined length over twice that of the bottom unit by itself. When collapsed for travelling, the structure exhibits a particularly low profile; yet when expanded the structure provides full headroom throughout. The structure is light in weight but strong and rugged, and is very easy to erect and take down by virtue of the novel structural arrangements employed in accordance with the invention.

The top unit may be put on top of a camper or trailer. It may even be used by itself to provide an enclosed patio or other room space with the house walls forming one wall. Or else, several structures obtained by several top units may be connected together to form a still larger enclosed space, such as a so-called mobile home of multiple unit size.

Another preferred arrangement in accordance with the invention comprises an expandable unit which is used in one embodiment in conjunction with a modular structure which is so designed and constructed as to provide a camper unit which may be used in a variety of mobile trailer and truck chassis or pickup camper variations. In this arrangement, the expandable unit has divided, hinged roof panels which fold into the unit for storage and which are unfolded and raised by means of cable and drum arrangements associated with the floor panel which also serves as the closure for one open side of the box in the closed position. A torsion spring arrangement is incorporated into the cable and drum system by which the floor and roof panels are opened or closed so as to facilitate and control the operation thereof in a manner which balances the various forces involved and make it a simple task for anyone needing to operate the unit. A variation of this design provides a particular type of "fifth-wheel" type of trailer with the capability of expansion to true mobile home dimensions.

In accordance with a particular aspect of the invention the expandable unit may be used entirely independently to provide an effective modular structure of temporary or semi-permanent installation when expanded to full space capacity while providing a very compact and easily storable and transportable package of roof, floor and wall panels which is self-erectable and which may contain the furniture for such a modular structure, also stored therein in knocked-down form. In this arrangement, the expandable unit is provided with two sets of torsion spring, cable and drum assemblies which are operated in succession to first rotate the entire unit less one floor panel to an upright vertical attitude and then rotate the second floor panel to horizontal orientation on the opposite side of the central storage box while at the same time raising and opening the folded roof panels on opposite sides of the box, after which the walls may be opened and locked in position to complete the erection of the expanded enclosure.

The novel features that are considered characteristic of this invention are set forth with particularity in the appended claims. The invention itself, however, both as to its organization and method of operation, as well as additional objects and advantages thereof, will best be understood from the following detailed description when read in connection with the accompanying drawings, in which:

DESCRIPTION OF THE PREFERRED EMBODIMENTS

Figure 1:
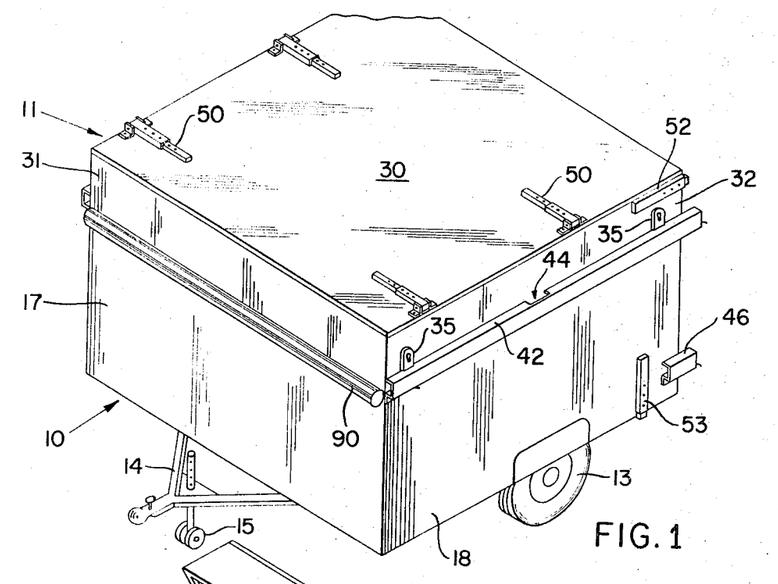
FIG. 1 is a view in perspective of a trailer carrying the collapsed, habitable structure of the invention.

Referring now to the drawings, and particularly to FIG. 1, there is illustrated a trailer generally indicated as 10 having a top or roof unit 11 embodying the present invention. The trailer or bottom unit 10 is provided with a pair of wheels 13 for moving the trailer. An "A" frame 14 is attached to the trailer 10 for pulling the trailer by an automobile. The hitching frame 14 may be provided with an auxiliary wheel 15 on a suitable support secured to the frame 14 to maintain the trailer 10 in a horizontal position when setting up at a campsite. Auxiliary wheel 15 may be rotated or unfolded up out of the way when the trailer is being transported.

Figure 2:
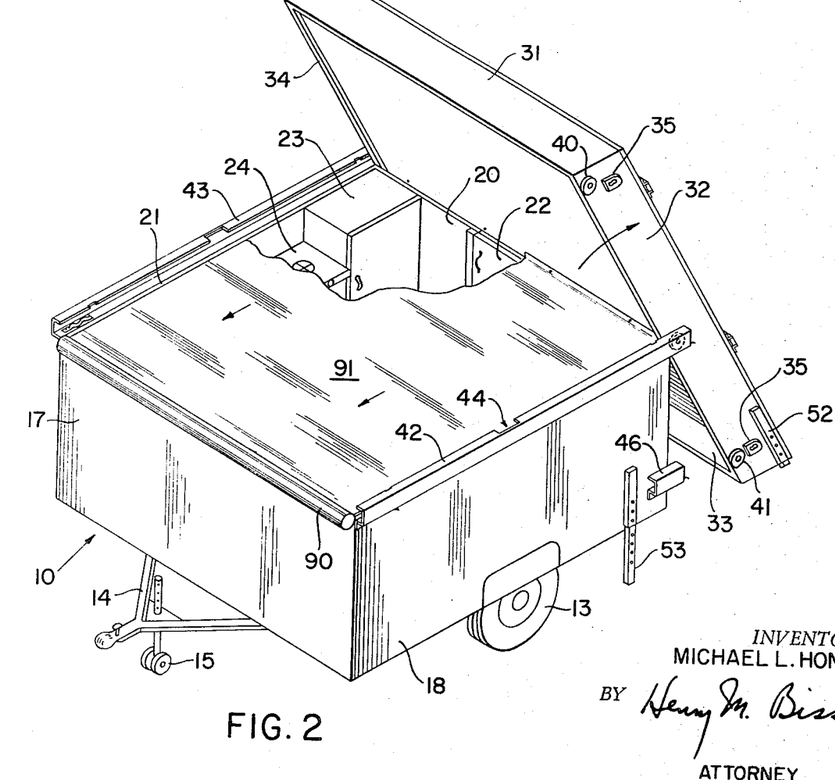
FIG. 2 is a view in perspective of the trailer of FIG. 1 with the collapsed structure of the invention slid over the trailer unit and rotated partly through the full angle of 90°.

As seen in FIGS. 1 and 2, the unit may be equipped with a waterproof shield 12 to protect the interior of the unit from the elements during folding and unfolding of the forward expandable portion. The shield 12 is preferably of thin plastic attached at one edge to the front wall section, and arranged to recede into a storage roll 19, drawn by a spring-loaded roller.

Figures 3, 4:
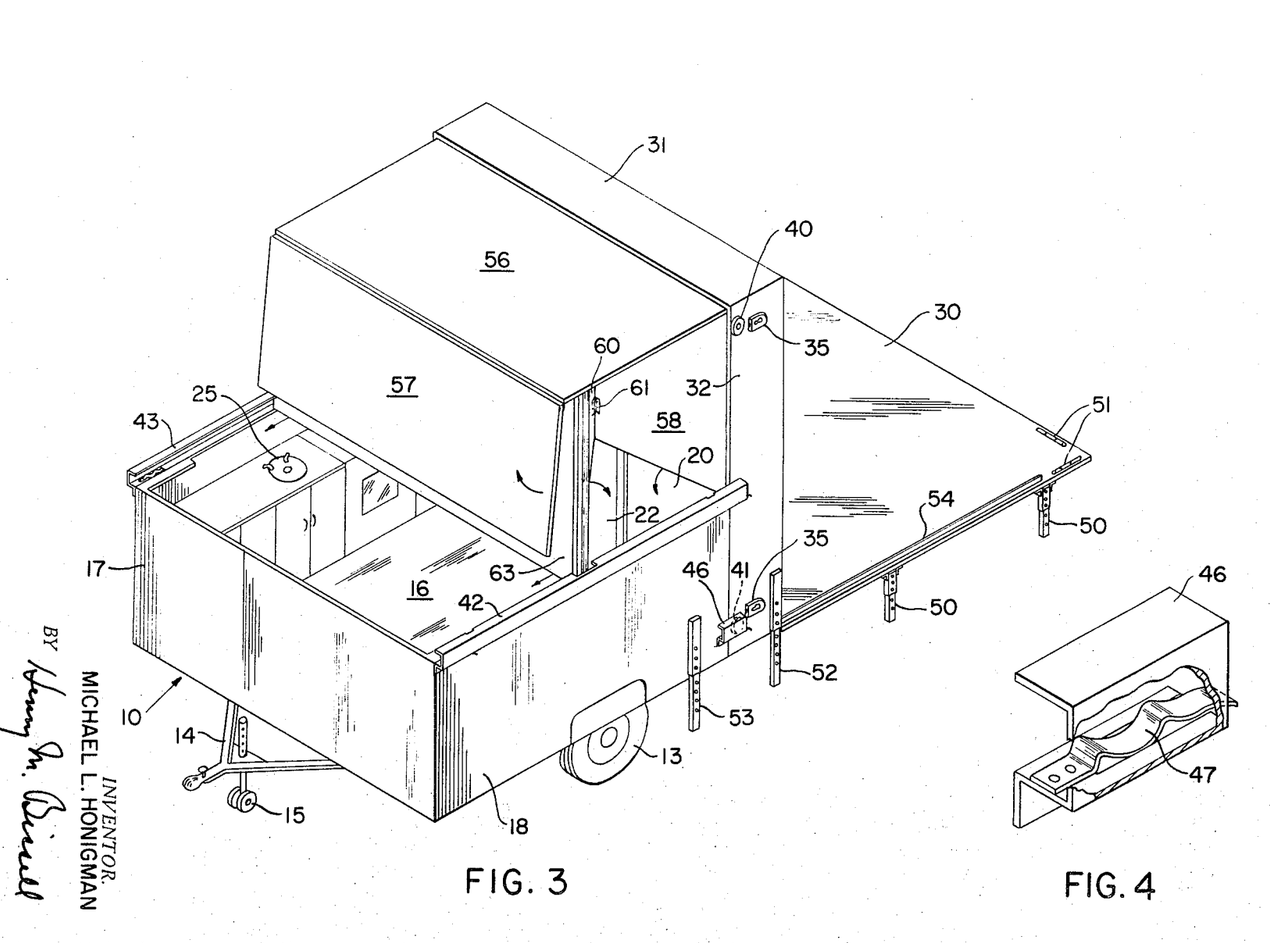
FIG. 3 is a view in perspective of the trailer of FIGS. 1 and 2 with the habitable front compartment partly unfolded and with the floor of the rear compartment unfolded and leveled.
FIG. 4 is a detailed perspective view of a channel and latch for one of the rollers of the top unit for locking the top unit to the bottom unit or trailer.

As shown particularly in FIGS. 2 and 3 the trailer 10 may be provided with a floor 16 and four side wall 17, 18, 20, and 21 rigidly attached to the floor 16. The wall 20, which later becomes the wall interconnecting front and rear compartments as will be more fully explained hereinafter, may have a removable partition 22. This partition 22 may be slidable into the remainder of the side wall 20 or it may form a door. In any case an open space is provided to permit access from the front compartment to the rear compartment.

The enclosed space formed by the floor 16 and the side walls 17, 18, 20 and 21 forms part of the front compartment or the habitable front portion of the unfolded structure. Various appliances may be built into this space, such as a refrigerator 23, a range 24, and a sink 25 with cabinets.

The top unit 11 forms the roof for the trailer 10 when the entire structure is in the condition shown in FIG. 1. This top unit 11 is of generally box-like or parallelepiped shape. It generally consists of a roof portion 30 and four side walls 31, 32, 33 and 34. The four side walls 30 to 34 form a rigid structure capable of containing in a folded state the various roof portions, side walls and the rear floor of the expanded structure. These portions may be made of wood, plywood panels or fiberboard or of light-weight metal such as aluminum.

The top unit 11 is secured to the trailer 10 in any suitable manner such, for example as by latches 35 (FIG. 1). The latches 35 removably secure, for example, the side wall 18 of the trailer to the side wall 32 of the top unit 11. Preferably the exposed top portion 36 of the trailer side wall 17 is of L-shape to provide a seal with the corresponding L-formed bottom portion 37 of the side wall 31 of the top unit. This will seal the two units together but permit the top unit to be slid towards the right as shown in FIG. 2.

This sliding movement is facilitated by two pairs of rollers 40 and 41 disposed at the forward and rearward ends of the side walls 32 and 34. These rollers move in generally U-shaped channels 42 and 43 forming the top portion of the trailer side walls 18 and 21.

When the top unit 11 is slid to the right of FIG. 2 (i.e., rearward), the rear rollers 41 leave the channels 42 and 43 while the front rollers 40 continue to slide in the channels. Eventually the front rollers 40 move below a pair of openings 44 in the channels 42 and 43 which permit the front rollers to disengage from the channels. The top unit may now be rotated through an angle of 90° into the position of FIG. 3. The top unit may now be locked to the trailer or bottom unit 10 in any suitable manner. To this end a channel 46 shown particularly in FIG. 4 may be provided which has a lower ramp portion 47 to engage and lock the rear rollers 41. The rollers 41 may be disengaged by lifting the top unit 11 or lowering the trailer 10.

After the top unit 11 has been rotated into the position of FIG. 3 and properly locked to the bottom unit or trailer 10, the structure may now be expanded or, rather, unfolded. To this end the roof portion 30 of the top unit is folded out to provide a floor for the rear compartment. The floor 30 may be suitably hinged to the side wall 33 of the top unit, for example by piano hinges.

To provide a firm support for the structure, the floor 30 is provided with a plurality of telescoping supports or legs 50 which may be rotated through 90° and locked when the floor is level. To insure that the floor is level, a pair of built-in levels 51 may be provided at one corner of the floor 30 and disposed at right angles to each other. Similar telescoping but non-rotating legs may be provided on the side wall 32 as shown at 52 and on the side walls 18 and 21 as shown at 53. Suitable tracks 54 maybe disposed parallel to the opposed edges of the floor 30 to permit the side walls to rest securely therein and to provide a seal.

Figures 5, 6, 7:
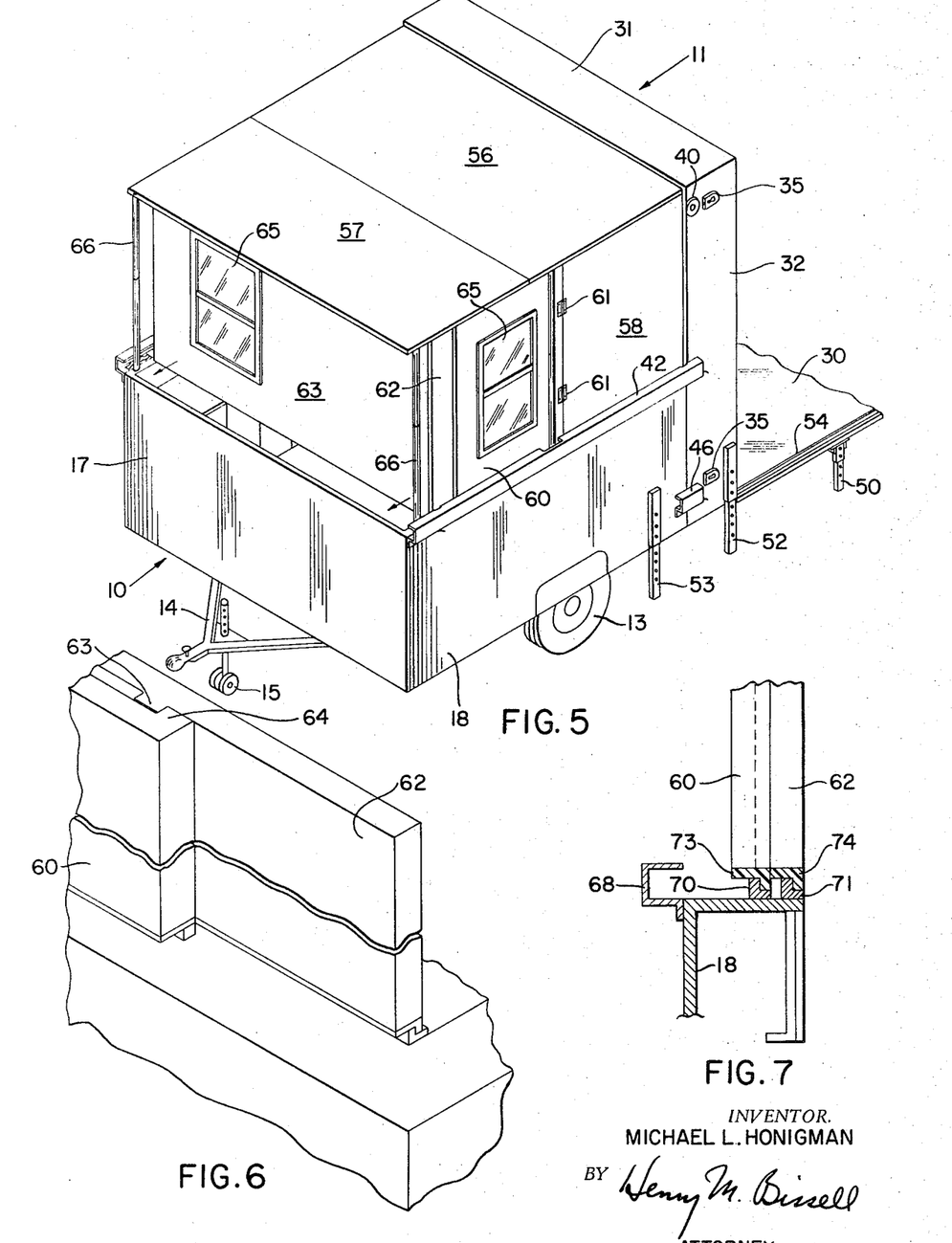
FIG. 5 is a view in perspective, parts being broken away, showing the erected or unfolded front compartment disposed on the trailer.
FIG. 6 is a perspective view of a detail of two sliding walls and their waterproof stop.
FIG. 7 is a sectional view of a channel for a roller of the top unit, and showing the waterproof seals at the bottom of the wall panels thereabove.

The construction of the forward compartment will now be described by reference to FIGS. 3 and 5. The forward roof is formed of two portions 56 and 57. Front roof portion 56 is hinged to th side wall 31 while the other front roof portion 57 is hinged to roof portion 56. The roof portion 56 is first rotated into a horizontal position and is held there by moving a side wall portion 58 forward. The side wall portion 58 is hinged to the side wall 32. An outer side wall portion 60 is in turn hinged by hinges 61 to the rearward side wall portion 58. It will be appreciated that rotation of the side wall portions 58 and 60 as the forward wall 63 is moved forward in guide tracks will first partially support roof portion 56 as shown in FIG. 3 and then will support both roof portions 56 and 57 in a horizontal position as shown in FIG. 5. The last side wall portion 62 is a slide wall and moves parallel to the wall portion 60 until the entire side walls 18 and 21 of the trailer are covered.

The front wall 63 is hinged to the slide wall 62. It will be understood that similar side walls are unfolded on the side opposite that shown in FIGS. 3 and 5, and that the front wall 63 is hinged to another slide wall corresponding to slide 62. Also suitable windows or mosquito screens 65 may be provided in side wall 60 and front wall 64 as shown. Suitable supports such as rods 66 may be hinged to the roof portions 56 and 57 to support the roof from the side walls 18 and 21 of the trailer during folding and unfolding of the front and side walls 63, 57 and 58.

The front compartment or habitable front space is now completed. The rear compartment is next unfolded as shown particularly in FIGS. 8 and 9. However, before explaining the construction of the rearward compartment, some details of construction will first be explained.

Referring now to FIGS. 6 and 7 there is illustrated the sliding construction of wall portions 60 and 62. Wall portion 62 is provided with a projection 63 of generally rectangular cross-section which abuts against the end portion 64 of wall 60 having an L-shaped section when the two wall portions have reached the end of their travel. This will seal the two wall portions by means of any conventional resilient sealing material, thus making the structure waterproof.

FIG. 7 is a cross section showing a detail of the channel for the rollers 40 and 41. Thus 68 is the U-shaped channel for guiding the rollers 40 and 41. The lower ends of the walls 60 and 62 have L-shaped portions 73 and 74 respectively which abut mating L-sections 70 and 71 attached to the side wall 18 of the trailer 10. The various end portions 70 to 74 may be made of suitable resilient sealing material to ensure that the walls are water and weatherproof. This construction may be used throughout the top unit 11 when appropriate.

Referring now again to FIGS. 8 and 9, the unfolding of the rear compartment will be described. The rear roof portion 76 is now rotated into position about its hinge to the side wall 31. The roof portion 76 may be supported by the floor 30 via supports or rods 77 which may be hinged to the roof portion 76.

Figure 8:
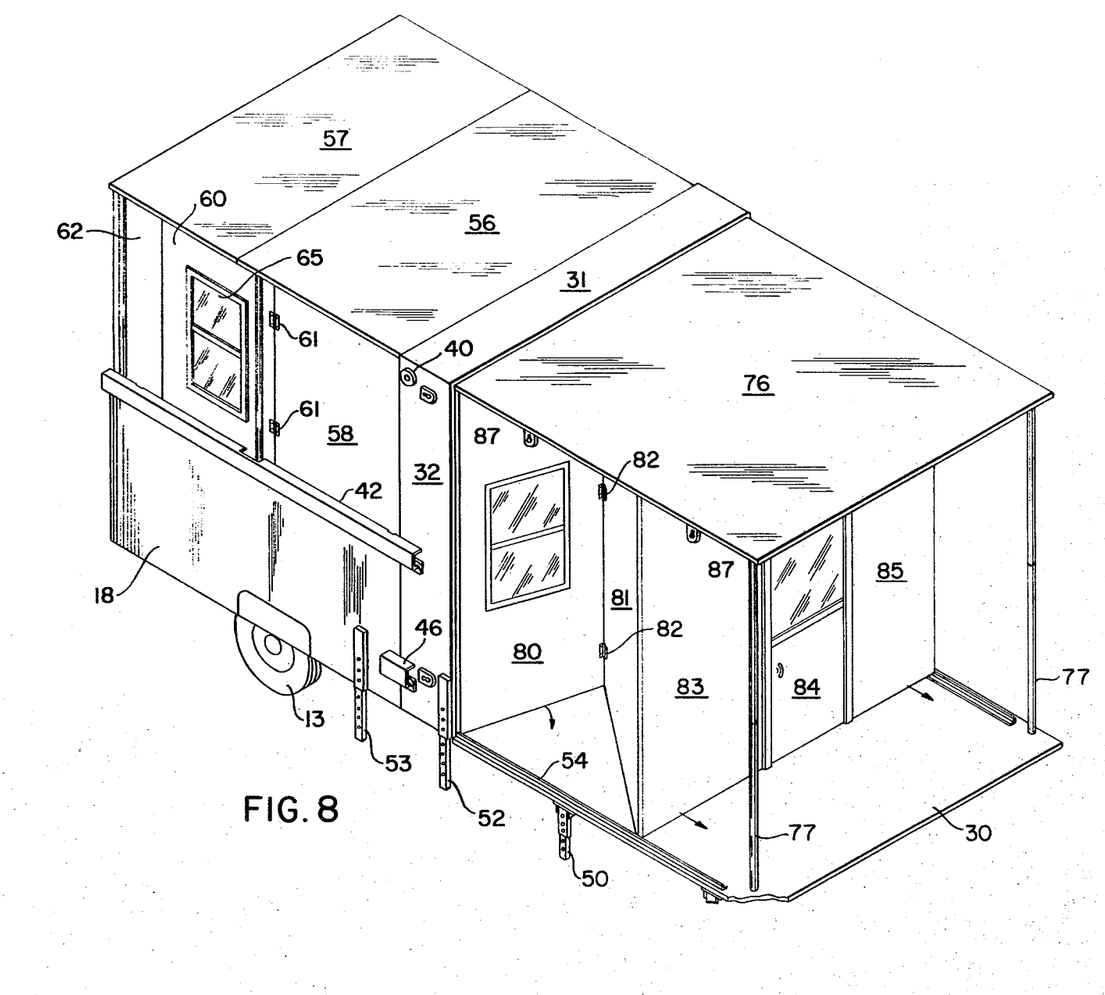
FIG. 8 is a view in perspective showing the front compartment fully opened and the rear compartment partially assembled or unfolded.
Figure 9:
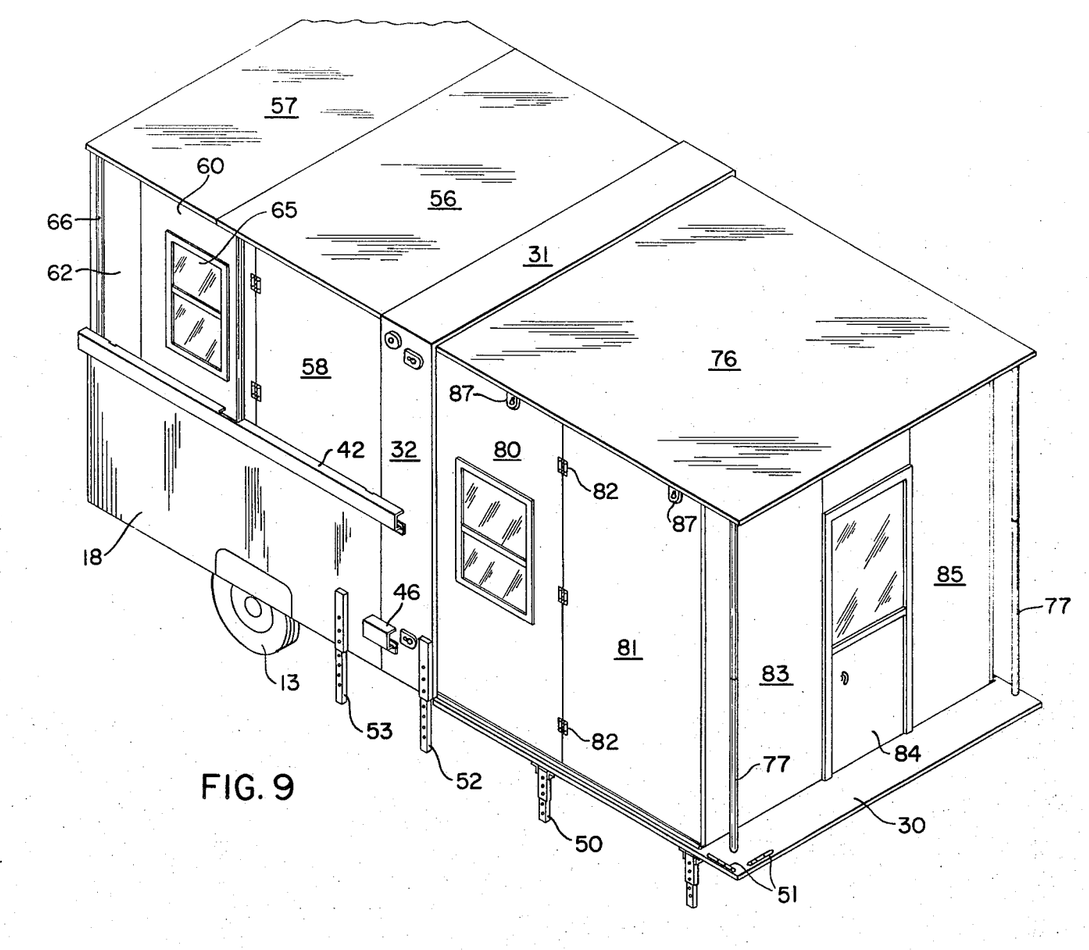
FIG. 9 is a view in perspective showing the trailer with the fully unfolded front and rear compartments.

Now the respective side walls are unfolded as the rear wall is moved out along tracks in the floor and roof portions. The rear side wall portion 80 is hinged to the side wall 32 and rotated through a right angle. The next side wall portion 81 is hinged to wall portion 81 and to a corresponding side wall portion on the opposite side. An access door 84 is shown within the rear wall portion 83. The entire structure is now ready for use. Latches such as shown at 87 may be used to lock, for example side wall 81 to the roof 76. The hinged side wall portions 80, 81 and 58, 60 of both the front and rear sections may be held in the open position by internal spring-loaded elements (not shown) which established suitable rigidity and permanence to the structure, yet yield to inward pressure applied to the hinges between the side portions when the unit is to be folded for traveling.

The structure may be folded up in reverse order, and the top unit 11 secured again to the top of the trailer to continue the trip to another location.

Instead of having the front and rear walls of the unit slide out with rotation of the hinged side wall portions about vertical edges, as described, the same concept may be used with the hinged sections rotated through 90° if desired. Thus roof sections 56, 57 may be one solid sheet hinged along the side edges to folding side wall portions which are hinged along horizontal edges. In this alternative arrangement, after the top unit 11 is removed from the trailer unit 10, the solid roof section corresponding to 56, 57, stored between the units 10 and 11, may be raised, taking the horizontally hinged side wall portions with it. In such an arrangement, the channels 68 would preferably be fastened to the roof to provide added stiffening. Where molded plastic is used as the construction material, the roof and attached channels may be molded as an integral unit. A similsr construction may be employed for the rear unit, if desired. Various other methods of folding and collapsing the wall- and roof-structure may be devised for storage within, or in conjunction with, the slidable top section as described within the concept of the present invention.

Instead of using the folded-up top unit of the invention as a temporary roof for a trailer as shown in FIGS. 1 through 9, it is also feasible to use the top unit 11 with a camper. This has been illustrated in FIG. 10 to which reference is now made. Here the camper generally shown at 96 is provided with the top unit 11 which may be identical to the perviously described. The roof unit 11 may be slid off the camper, rotated through a right angle and unfolded as outlined before to provide a living unit more than twice as long as the camper body. Despite the large capacity thus provided in the expanded living unit, an extremely low profile is achieved in the folded unit, as will be noted in FIG. 10, thus materially improving safety of travel in such campers and trailers, particularly in areas of high crosswinds.

Figure 11:
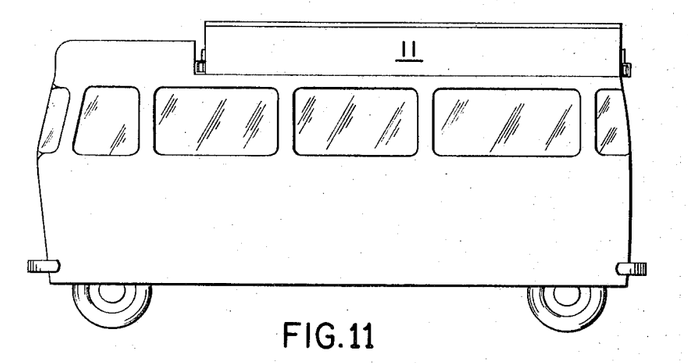
FIG. 11 is a side elevational view of a panel truck or micro-bus having a roof portion embodying the invention.

In FIG. 11 there is shown a panel truck or micro-bus 97 with the cover unit 11 disposed over its top. The cover unit 11 may be slid off the end or the side and then rotated through 90°; after which the sections stored within the unit 11 may be unfolded in the manner described above to provide a full room unit attached to the panel vehicle 97.

Figure 12:
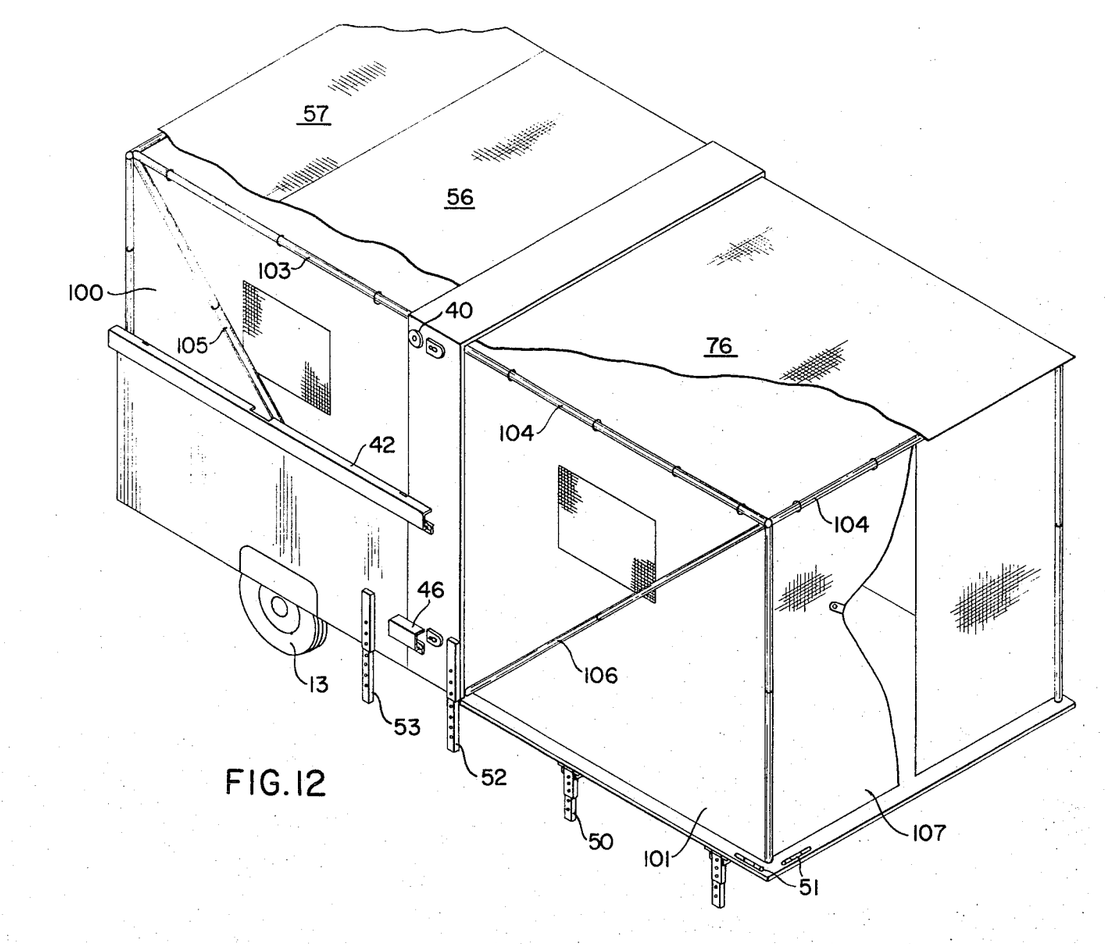
FIG. 12 is a view in perspective of an unfolded front and rear habitable compartment in accordance with the invention having canvas panels forming the side walls and reinforced by pole supports.

FIG. 12 illustrates a modified top unit 11 with canvas walls instead of rigid panel walls which can be made to sell at very low cost and which is extremely light in weight. Roof portions 56, 57 and 76 may be the same as previously described. However, a complete tent-like enclosure may be provided for unfolding and setting up underneath the rigid roof portions 56, 57 and 76. The front side walls such as 100 may consist of canvas or any other waterproof fabric as are the rear side walls 101. Since the side walls are of fabric or some other flexible material, they now preferably consist of a single piece. For support, the canvas wall 100 may be secured to a rod 103 on the roof portion 56, 57 by means of loops and may be reinforced by additional diagonal rods such as 105. The rear wall 101 may be suspended from rods 104 secured to the roof 76 and may be reinforced by a diagonal rod 106. The rods 103-106 may, of course, be placed in position after the roof portions 56, 57 and 76 are set up, as is known in the construction of conventional tent frames. A tent-like canvas panel 107 may form the rear entrance. The tent flaps may be held up by suitable strings or ties.

The top unit may also be emloyed in a configuration which may be mounted on a conventional automobile sedan. A configuration of an "auto-camper" is known which mounts in the automobile trunk with the trunk lid removed, extending up and over the automobile roof where it is further supported. In the present configuration, only the top unit and a shallow base extend over the automobile roof when the entire structure is collapsed for travelling, thus exhibiting a substantially lower profile than has hitherto been possible for comparable systems. To set up for camping, the top unit is slid rearward and rotated through 90°. The folded wall sections are then slid out and unfolded in both directions as already described to develop an enclosed structure including one room of about 7 × 9 feet in floor space with full head room plus a separate sleeping room of equal floor area and about 3 feet in height.

Figure 10:
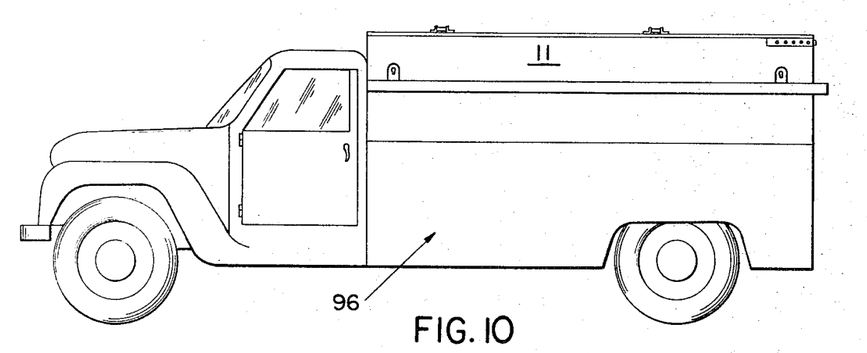
FIG. 10 is a side elevational view of a camper having a roof portion in accordance with the invention.
Figure 13:
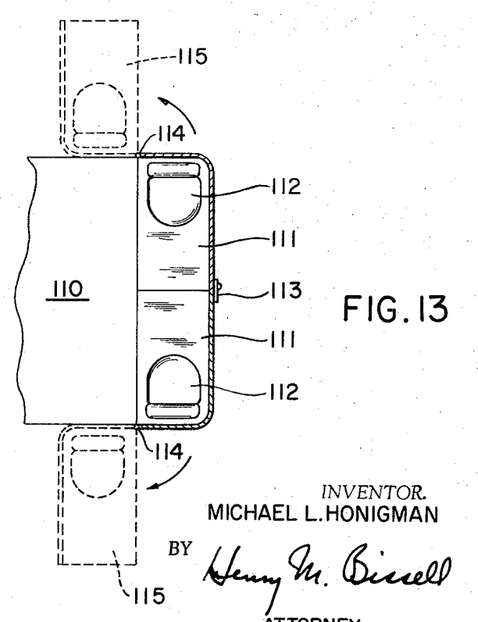
FIG. 13 is a top plan view, parts being broken away, of a camper having two passenger pods in the rear which may be rotated out of the way for setting up the expanded camper unit.

When the top unit of the invention is used with a camper as in FIG. 10, there will not normally be enough space to accommodate additional passengers which cannot find space in the driver's compartment. Accordingly a camper as illustrated in FIG. 13 may be used. Here the camper 110 is provided with two passenger pods 111 to the rear of the vehicle 110, each being provided with a seat 112 for a passenger. When the vehicle is moving, the two passenger pods may be locked by a latch 113. Each pod 111 is hinged as at 114 so that each may be rotated through an angle of 180° into the dashed-line position 115 where they are out of the way and permit clearance for unfolding the camper unit as previously described.

Figure 14:
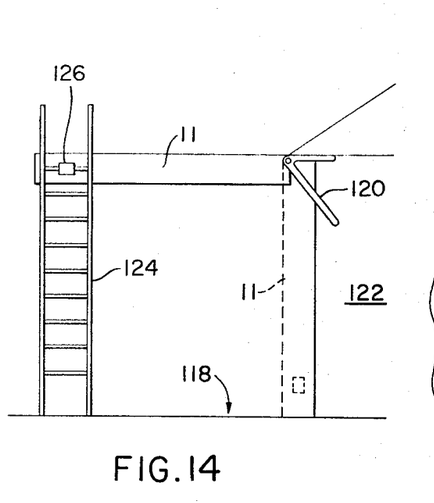
FIG. 14 is a side elevational view of a unit of the invention mounted against a house for providing an extra room as desired.

The top unit of the invention may also be used to provide a stationary habitable space. Thus the unit may be unfolded against the wall of a house to provide an enclosed habitable patio space. This is shown in FIG. 14 where the storage unit 11 is supported over a patio 118 from braces 120 extending from a house 122. The unit 11 here provides shade for the patio and also serves as a sundeck accessible by a ladder 124 which also serves as one of the supports for the outer end of the unit 11, releasably connected thereto by a bracket 126 which rests on a rung of the ladder 124. When it is desired to enclose the patio 118, the ladder 124 or other suport is removed and the unit 11 is rotated downwardly through 90° against the wall of the house 122 as indicated in broken outline. The stored roof and walls may then be unfolded from the unit 11 as described hereinabove to enclose the patio 118.

Alternatively the unit 11 may be installed against the building 122 in the vertical position for utilization whenever an extra room is desired.

For a still larger enclosure than those described hereinabove, as may be comparable to a so-called mobile home structure, it is feasible to interconnect two trailers of the type shown in FIGS. 1 through 9. Thus two units may be put back to back or in line so that the trailer wheels are adjacent to each other. The two trailers may have a combined length of 16 feet while the extended two units have a length of over 34 feet. Also the two units may be disposed side by side with the two boxes 11 adjacent to each other or with one box 11 adajcent the rear compartment of the other unit. Finally the two units may be disposed at right angles to each other. In any case if the trailer has a length of 8 feet, the extended structure may have a length of 17 feet 13 inches. Similarly a double length trailer (16 feet long) may be provided, preferably on a tandem axle, with two top units (each 8 feet long) slidable of the opposite ends or off the sides to provide an expanded double unit.

Figure 15:
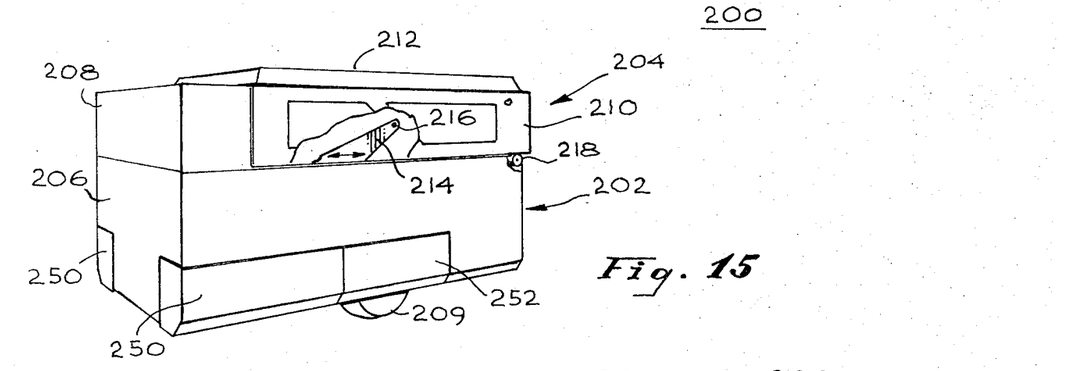
FIG. 15 is a perspective view, partially broken away, of an improved modular unit in accordance with the invention, shown mounted for conventional trailer transport.
Figure 16:
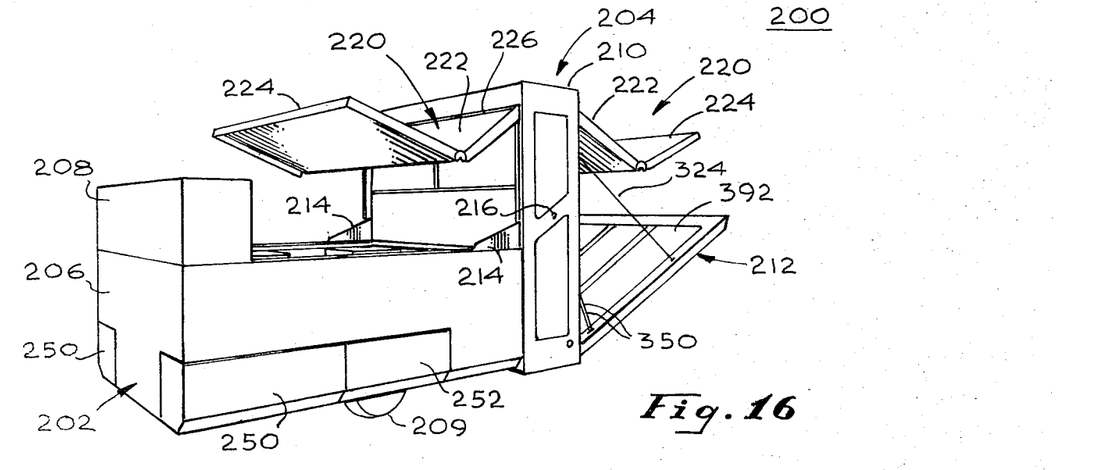
FIG. 16 is a perspective view showing the unit of FIG. 15 partially erected.
Figure 17:
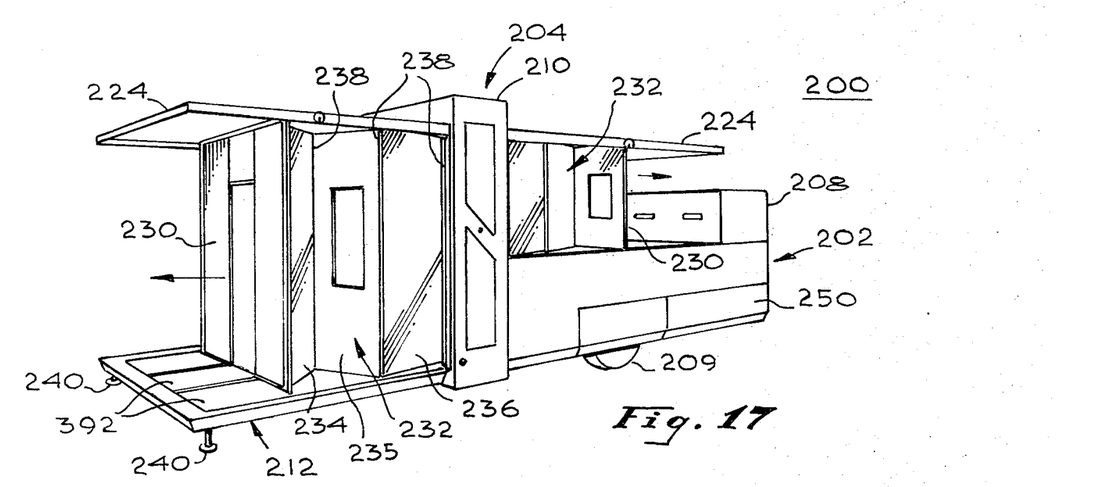
FIG. 17 is a perspective view of the arrangement of FIGS. 15 and 16 in a further stage of the erection procedure, the view being taken from the opposite side relative to FIGS. 15 and 16 in order to show further details.

Turning now to FIG. 15, there is shown an improved modular structure in accordance with the invention which has been designed for utilization in a variety of different applications of mobile, vehicle-mounted, expandable structures. FIGS. 16 and 17 illustrate different views of the same arrangement at different points in the erection process. In FIGS. 15 – 17 there is shown a modular unit 200 comprising a base unit 202 and top unit 204. The base unit or body 202 is shown with a lower portion 206 extending the full length of the unit and an upraised portion 208 at the front end. The body is mounted on a chassis (not shown) supported by wheels 209 and having a trailer tongue and hitch (also not shown) extending from the front end (the left-hand end in FIGS. 15 and 16). The top unit 204 includes a box 210 and a floor section 212 which, in the position shown in FIG. 15, serves as a top closure for the box 210. The top unit is pivotably mounted on cantilever members 214 at pivot points 216 on opposite sides of the top unit 204 which are located at approximately the center of gravity thereof. Also seen in a broken away portion of FIG. 15 is a roller 218 which provides additional support for the top unit 204 as it is moved backward or forward on the body 202. The cantilever members 214 are mounted in longitudinal channels for easy movement back and forth between the position shown in FIG. 15 and that shown in FIG. 16 wherein the box 210 is rotated 90° to a vertical attitude to permit expansion of the unit to its full space enclosure.

FIG. 16 illustrates the unit 200 with the floor 212 partially lowered and the roof sections 220 partially raised. It will be noted that each roof section 220 comprises an inboard roof panel 222 and an outboard roof panel 224. The roof panels 222 and 224 are joined to each other by means of a flexible plastic hinge, which is both durable and effective for this purpose and also serves to provide a weathertight seal across the juncture between the two panels. A similar hinge, designated 226, is provided at the juncture between the panel 222 and the box 210. Further details of the mechanism for expanding the floor and roof panels will be discussed in connection with FIGS. 18 and 19 hereinbelow.

FIG. 17 illustrates the unit 200 with the floor down, the roof sections raised, and end walls 230 and side walls 232 in the process of being extended and expanded toward the full enclosure position. In FIG. 17, each side wall 232 is shown comprising three separate panels 234, 235, and 236. Plastic hinges 238, of the type already described, are provided to join adjacent pairs of side wall panels to each other and to join the panel 236 to the box 210. Watertight seals are provided at all junctions of adjacent panels, either by means of the plastic continuous hinge strips 238 and 222, or by means of compression seals at junctures between the end walls 230 and the ends of the roof panels 224, the upper body portion 208, the lower body portion 206, and the like.

Suitable retractable floor jacks 240 are shown in position in FIG. 17 to support the floor 212 in its lowered position. These floor jacks 240 are adjustable to permit leveling of the floor 212 on uneven or slanting terrain.

In addition to the structure as thus far described, the unit 200 of FIGS. 15 – 17 is shown with detachable storage boxes 250 and wheel well panels 252. These are designed for addition in the event of a trailer or chassis mounted unit such as is shown in these figures, and for removal to provide a basic module which is adapted to fit within the space in a pickup truck box in a fashion corresponding to conventional camper utilization.

At each point at which one panel or sub-unit is to be mounted against another panel or sub-unit for rigid support, a suitable locking mechanism is provided. Such a locking mechanism may comprise a unit referred to as a cam-lock, of the general type conventionally employed for the final closing and locking of casement windows, for example. Thus, one or more cam-locks is provided for securing the lower portion of the box 210 to the rear end of the body 202 in the attitude shown in FIGS. 16 and 17. Similar cam-locks may be provided for securing the end walls 230 to the roof panels 222, 224 and the floor 212, once the end walls are in the fully extended position, as well as being provided to affix the top unit 204 to the body unit 202 when the unit 200 is fully retracted in readiness for transport.

Figure 18:
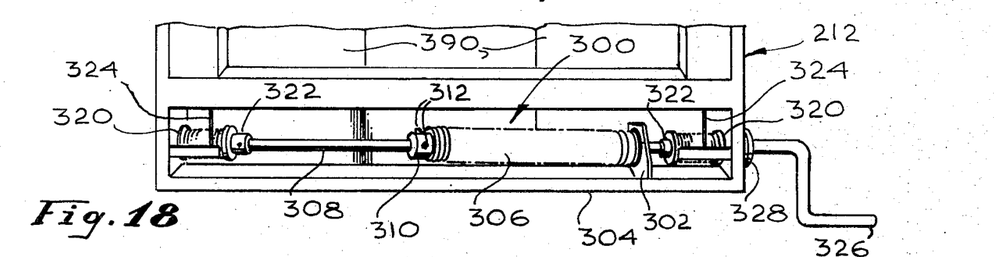
FIG. 18 is a view of a portion of the arrangement of FIG. 15, illustrating a particular mechanism for effecting the extension of the roof and floor sections in the step illustrated in FIG. 16.
Figure 19:
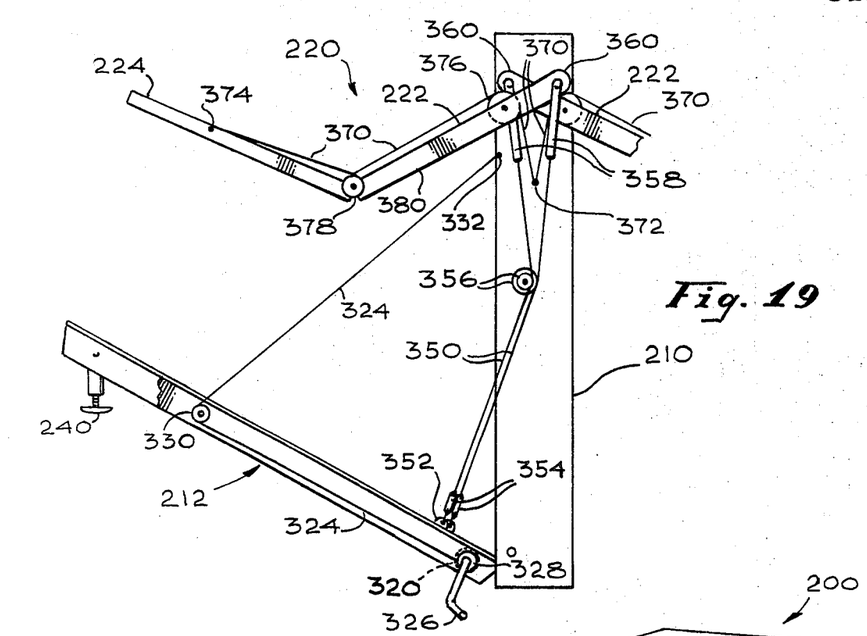
FIG. 19 is a side elevational view of a portion of the unit of FIG. 16, showing particular details thereof.

FIGS. 18 and 19 illustrate details of a preferred mechanism by which the roof and floor sections may be extended, supported, and retracted. FIG. 18 illustrates a portion of the floor 212 as viewed from the underside with the outermost covering removed. In the view of FIG. 18 there is shown a force compensating mechanism 300 mounted transversely across the lower edge of the floor 212 by means of bearings (not shown in detail) in the sides of the floor 212 and in a bracket 302, affixed to the end panel 304 of the floor 212. The mechanism 300 comprises a torsion spring 306 affixed at its right-hand end to the bracket 302 and at its left-hand end to a shaft 308 by means of a locking collar 310 having locking bolts 312 for securing the collar 310 to the shaft 308. At opposite ends of the shaft 308 are a pair of cable drums 320, also affixed for rotation with the shaft 308 by means of locking collars 322. Separate cables 324 are shown wound around the drums 320. A crank 326 extends from the right-hand end of the shaft 308 for controlling the rotation and position thereof. A locking plate 328 and locking pin (not shown) are included for locking the shaft 308 at a preferred position.

Referring to FIG. 19, it will be observed that the cables 324 extend outwardly within a hollow section of the floor 212 from the drums 320, pass around respective pulleys 330 and then to an anchor point 332 near the top of the box 210. The arrangement as thus described in FIGS. 18 and 19 serves to compensate for the force developed by the weight of the floor 212 as it is raised and lowered so as to permit a relatively slight force applied to the crank 326 to move the floor 212 in either direction. With the floor 212 in vertical position against the box 210, the cables 324 are wound to the maximum extent around the cable drums 320. At this point the locking collar 310 of the torsion spring 306 will have been secured to the shaft 308 in accordance with specifications provided by the manufacturer of the spring 306 in accordance with the dimensions and characteristics of the spring 306. This is the position of minimum torque applied by the spring 306 to the shaft 308. As the floor 212 is rotated outwardly to assume its lowered position, the cables 324 unwind from the cable drums 320, causing the shaft 308 to rotate and drive stored torque into the torsion spring 306. The crank 326 may be employed in this operation if desired or needed, although with the entire mechanism properly balanced it is literally possible to raise or lower the entire assembly, including the floor and roof panels, by fingertip pressure. For raising the floor 212, the torsion spring 306 applies a force counterbalancing the force of gravity from the weight of the floor 212, thus winding the cables 324 on the drums 320 until the floor 212 assumes the upright position against the box 210.

It will be noted that the floor 212 also has a pair of cables 350 anchored thereto by means of brackets 352 and adjustable turnbuckle devices 354. These cables 350 pass over pulleys 356 rotatably secured to the box 210 and connect with respective U-shaped tension members 358 which in turn are pivotably mounted to the inboard ends of respective roof panels 222. Thus, as the floor 212 is raised or lowered relative to the box 210, the cables 350 and related mechanism serve to move the roof panels 222 between extended and retracted positions.

An additional cable assembly will be noted involving cables 370 which are fastened at one end 372 to the box 210 and which are secured at the opposite end at points 374 to the respective outer roof panels 224. Each cable 370 passes over a first spool 376 and around a second spool 378. The first spool 376 is affixed to the box 210 at the pivot support of the roof panel 222. The second spool 378 is located at the pivot support for the outboard roof panel 224 and is affixed for rotation with the panel 224. The radius of the first spool 376 is twice the radius of the second spool 378. This arrangement permits the panel 224 to undergo a rotation of 180° in one direction relative to its support member (the beam 380) while the support beam 380 and inboard roof panel 222 rotate through 90° in the opposite direction between fully opened and fully closed or folded position within the box 210. Relative to the box 210, however, the separate roof panels 222, 224 each rotate through 90° but in opposite directions relative to each other. The spool 376 being affixed to the box 210, is stationary. The spool 378 does not rotate freely but is constrained by attachment to the panel 224 to rotate therewith. By virtue of this arrangement, the cable 370 does not slide on the spools 376, 378. Rather, the cable 370 merely shifts its points of entry and exit of the respective spools 376 and 378 as the mechanism moves between its extended and storage positions. Thus, the raising/lowering mechanism involving the cable 370 connected to the floor 212, and the cable 324 and drum 320 mechanism, the roof 220 and floor 212 move in unison with the weight of the floor as it is lowered serving to elevate and unfold the roof sections 220 and maintain them in a fixed, cantilever-supported position. When the unit is to be folded up, the weight of the roof sections 220 and the torque stored in the torsion spring 306, applied via the cable and drum mechanism of FIG. 18, assist in raising the floor 212 while the hinged roof panels 222, 224 fold together for storage in the box 210.

As may be seen in FIG. 18, the floor section 212 is provided with compartments 390 for the storage of bedding and various items of collapsible furniture in knockdown form. Access to these compartments 390 from the room formed by the expanded structure is afforded by various removable covers 392 (FIGS. 16, 17).

Figure 20:
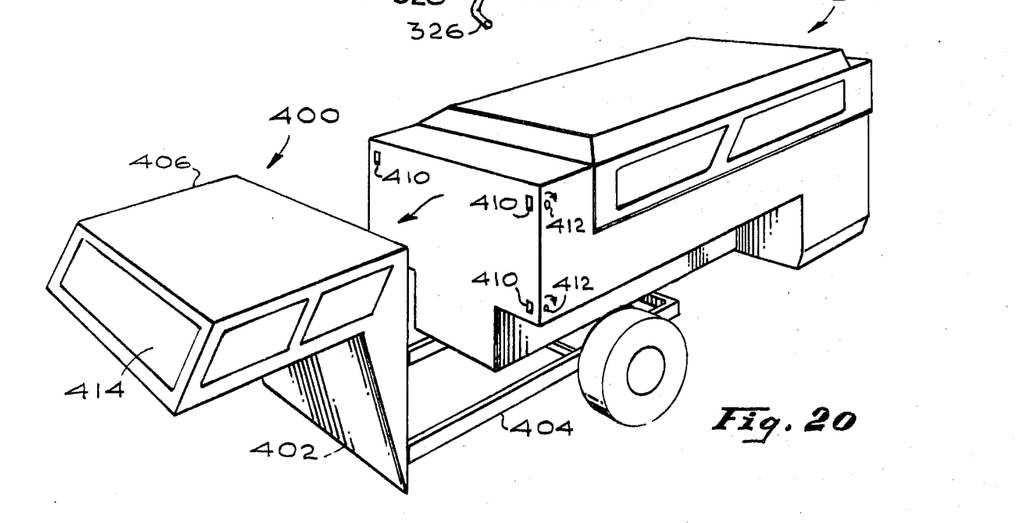
FIG. 20 is a perspective view illustrating the manner in which the transport module of FIG. 15 may be assembled in an alternative type of trailer unit.

FIG. 20 illustrates the versatility of a modular unit 200 which has been designed for use in a variety of vehicle types. In FIG. 20, the unit 200 is shown with the storage boxes 250 and wheel well covers 252 removed. As indicated in FIG. 20, the module 200 is to be mounted on a so-called "fifth-wheel" chassis. This is the type of traction system which has long been used with semi-trailer trucks and is now coming into practice with respect to pickup truck type trailer-towing units. In such an arrangement, a so-called "fifth-wheel" is mounted on the bed of the pickup for attachment to a coupler on the underside of a forward extension from the trailer. There are also particular arrangements for trailer towing in this fashion in which the fifth-wheel coupling unit is mounted on the top or trunk lid of an automobile. In the arrangement of FIG. 20, the fifth-wheel coupler unit is positioned on the underside of a forward section 400 which is affixed by rigid mounting means enclosed within the portion 402 to the frame 404 of the chassis unit 406. A rigid connection is provided between the unit 202 and the forward section 400 by means of cam-locks 410 (already described). Cam-locks 410 on the near side of unit 200 are shown with hexagonally-shaped drive sockets 412 which serve to rotate the locking members of the cam-locks 410 to lock the module 200 and the forward unit 400 together. In addition to providing the requisite support structure for the fifth-wheel coupler, the forward unit 400 is also arranged to provide additional storage area or a bed for sleeping accommodations within the upper extended portion 414 thereof.

Figure 21:
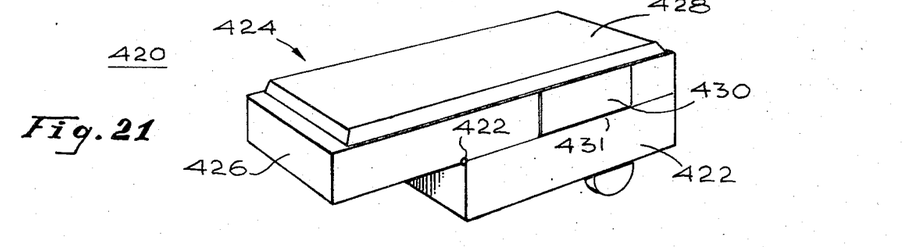
FIG. 21 is a perspective view of another arrangement in accordance with the invention providing for additional space enclosed by the unit in the expanded configuration.

FIG. 21 illustrates a somewhat different configuration of expandable trailer arrangement which is similar to the arrangement of FIG. 15 but differs therefrom principally in the provision of an elongated floor section and a top unit which does not slide relative to the bottom unit between storage and pivot positions. As shown in FIG. 21, a camping trailer unit 420 comprises a body unit 422 and top unit 424 rigidly but releasably attached together by means of cam-locks (not shown). The top unit 424 comprises a panel storage box 426 and a floor section 428 which also serves as the top cover for the entire unit 420 when the unit is in the retracted or folded position for transport as depicted in FIG. 21. The trailer vehicle 420 is designed for coupling to a traction unit by means of a fifth-wheel arrangement comparable to that described in connection with FIG. 20. The fifth-wheel coupling device is mounted on the underside of the forward projecting section of the box 426 near the front end thereof in a position such that when the box 426 is pivoted about its pivot point 427, the coupler device extends below the bottom of the body unit 422 and does not interfere with the joining of the box 426 to the front of the body unit 422 in the upright attitude.

Since the floor section 428 of the unit 420 is substantially longer than the extent of the box 426, it will be appreciated that the unit expands to a considerably greater length than is possible with the configuration of the module depicted in FIG. 15, for example. The roof panels stored within the box 426 are also longer so that when extended they will match the dimensions of the floor 428. Additional side wall panels are incorporated in the unit 422 and accommodate the additional extent of this structure when fully expanded. Expansion of the module is essentially the same as that depicted in FIGS. 16 and 17, however. In the case of the unit 420, side closure panels 430, preferably hinged along their bottom edge 431 to the body unit 422, are lowered against the sides of the body unit 422 or removed and extension of the roof and wall sections with additional side wall panels as needed over the body unit 422 is effected in a manner similar to that shown in FIG. 17. In a typical vehicle 420 such as shown in FIG. 21, the floor 28 is 15 feet 9 inches long, the lower box 422 is 10 feet in length and the overall height from the floor cover 428 to the ground is only 6 feet 6 inches. Yet this unit 420 permits expansion to a space enclosure having an exterior height of 10 feet, an interior height of 8 feet, and a length of approximately 28feet. No other expandable units are known which can provide such an expansion ratio with the strength and rigidity of the expanded structure, the ease of operation in expanding or retracting the various panels and sections in a vehicle of such weight and dimensions as are provided by this and other arrangements in accordance with the present invention.

FIGS. 22 – 25 illustrate still another arrangement in accordance with the present invention which is designed, not for wheeled transport as a camper or trailer, but instead for compact storage as complete modular units, each of which may be easily erected at the site by one man to provide a complete modular space enclosure which is rigid, weather-tight and semi-permanent.

Figures 22, 23, 24, 25:
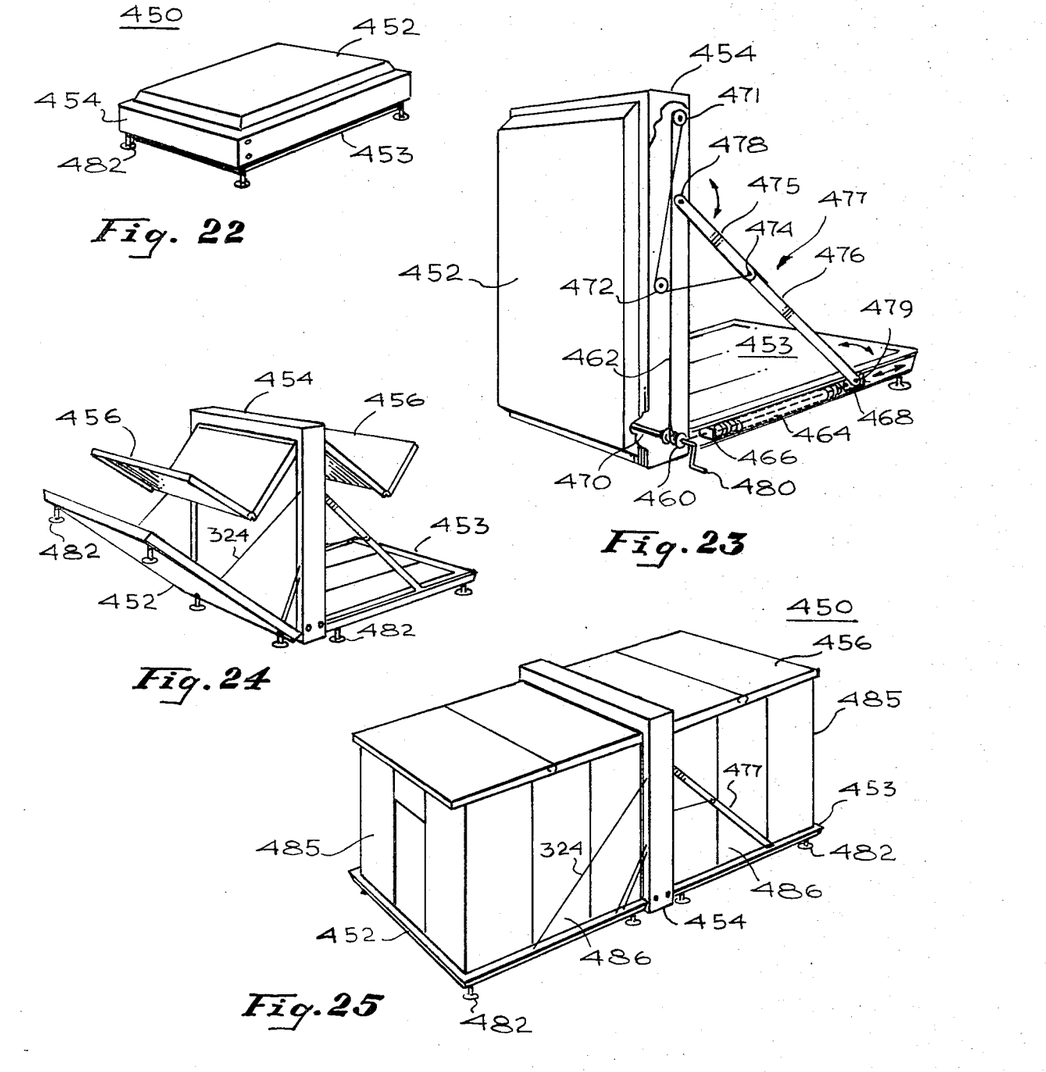
FIG. 22 is a perspective view of still another arrangement in accordance with the invention.
FIG. 23 is a perspective view of the arrangement of FIG. 2 after the first step in the erection procedure.
FIG. 24 is a view of the arrangement of FIG. 22 showing the unit after a further step in the erection procedure.
FIG. 25 illustrates the arrangement of FIG. 22 in the fully erected position.

FIG. 22 depicts the modular unit 450 which s basically comparable to the top unit 204 of FIG. 15 but with two floor sections 452 and 453 provided to enclosure the opposite open sides of the box 454. In this configuration, the unit 450 is provided with a pair of torsion spring/cable and drum mechanisms similar to that shown in FIG. 18. One operates in the fashion already described in connection with FIGS. 18 and 19 for the lowering of th floor 452 and the raising of the roof sections 456 (see FIG. 24). However, the additional torsion mechanism represented in FIG. 23 is provided in order to raise the box 454 to the vertical or upright attitude prior to further expansion of the unit 450. This latter mechanism is shown comprising a drum 460 about which a cable 462 is wound with a few turns and arranged to exit from opposite sides of the drum 460. Within a side compartment of the floor section 453 is a compression spring 464 anchored at one end to a fixed bracket 466 and at the other end to a slidable bracket 468. It will be understood that comparable mechanisms are mounted at both sides of the floor section 453 and coupled together by the shaft 470. The cable 462 is secured at one end to the slidable bracket 468 and runs through the center of the compression spring 464, around the drum 460, thence upward and around a pair of pulleys 471 and 472 which are pivotably mounted at the side of the box 454. Finally, the cable 462 extends and is secured at its outer end to a pivot point 474 which is the hinge between two sections 475 and 476 of a compression member 477 extending between the floor 453 and the box 454. The member 477 is pivotably mounted at opposite ends to the box 454 at pivot anchor 478 and to a second pivot anchor 479 on the slidable bracket 468.

As the drum 460 and shaft 470 are turned by means of the attached crank 480, the cable 462 may be driven to pay out on the lower end, thus releasing the compressed spring 464 and sliding the bracket 468 outwardly to slide and rotate the section 476 while at the same time drawing in on the opposite end anchored to the hinge pivot 474. Operation in this fashion forces the compression member 477 to unfold, thus developing relative rotation between the box 454 and the floor 453. The compression spring 464 and the torsion spring on the shaft 470 (see FIG. 18) effectively provide compensation and balancing of forces with respect to the weight of the box 454 with the stored structural panels therein, and the compression spring 464 further develops the force needed to cause the opening of the compression member 477 which rotates the box 454 to the upright position.

Thus, the unit 450 as shown in FIGS. 22 – 25 provides an entirely self-contained unit which may be stored compactly or erected by a single man to develop a space enclosure of approximately 8 feet in width, 18 feet in length and 8 feet in interior height from a storage case which is approximately 8 × 9 × 2½ feet. The total weight is approximately 400 lbs. depending on how much collapsible furniture and other equipment is stored in the 6 inch hollow floor sections.

Following the sequence of erection from FIG. 22 through FIG. 25, the unit 450 is prepared for erection by extending the jacks 482 to level the unit in position on the selected site. Thereafter (FIG. 23) the box 454 with its upper floor cover 452 is rotated to an upright attitude by manipulating the crank 480 in the manner already described in connection with the mechanism of FIG. 23. Thereafter, the crank 480 is moved to the torsion spring/cable and drum assembly on the left-hand side of the box 454 and this mechanism is operated in the manner already described in connection with FIGS. 18 and 19 to lower the floor section 452 and raise the opposite roof sections 456. Finally, the end walls 485 and folded side panels 486 are opened out to fully extended position as shown in FIG. 25 and, after latching the various joining sections together by means of the cam-locks already described, the complete space enclosure structure of FIG. 25 is ready for occupancy and use. To retract the unit for storage, the sequence of steps illustrated in FIGS. 22 – 25 is reversed. Opening and closing the unit 450 should normally take less than 5 minutes by one man, depending on the terrain on which the unit is placed.

There has thus been disclosed a movable or stationary habitable space enclosure which may be expanded to provide a large hibitable space from a small, light storage unit. The boxlike structure may be disposed to provide the roof of trailer or on top of a camper, panel truck or micro-bus. The extended space is over twice as long as that of the folded structure. The top unit may be slid off and rotated over the bottom unit of a trailer or camper thus facilitating the erection of the habitable space. The open top of the trailer may be protected by a temporary waterproof roof while the remainder of the structure is being unfolded. Also the walls are sealed to make them weatherproof. The panel storage compartment may also be used separately as an integral unit for a modular space enclosure which may be erected and taken down by one person in only a few minutes, but which when erected provides a semi-permanent, rigid, weatherproof structure of several times the volume of the unit when in storage configuration.

Although there have been described above specific arrangements of an expandable vehicle structure in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention.

What is claimed is:

1. A movable habitable space structure capable of being expanded for use comprising:
   a bottom unit having a floor and fixed side walls, and wheels underneath said bottom unit for ready transport;
   an expandable top unit of generally box-like shape slidable disposed on and covering said bottom unit before being expanded, said top unit being adapted to slide over said bottom unit and to rotate thorugh 90° and to be disposed adjacent thereto in a vertical position;
   a front roof portion, front side walls and a front wall portion for said bottom unit foldably disposed in said top unit and unfoldable for substantially covering and enclosing said bottom unit to form an enclosed habitable front portion; and
   a floor, a rear roof portion, rear side walls and a rearward wall portion foldably disposed in the open end portion of said top unit and adapted to enclose a space to form an enclosed habitable rear portion adjacent to and interconnected with the habitable front portion by the common side walls of the top unit, said habitable portions having a combined length over twice that of said bottom unit.

2. A movable habitable space structure as defined in claim 1 wherein said bottom unit and said wheels form a trailer adapted to be pulled by a vehilcle and further including telescoping legs on said top unit and on said bottom unit for supporting both said habitable front and rear portions level with respect to the ground.

3. A movable habitable space structure as defined in claim 1 wherein said bottom unit and said wheels form part of a camper, and further including two seat portions hinged to and forming part of the rear end of said camper, each of said seat portions being adapted to be rotated through an angle of 180° to extend substantially at right angles to the side walls of said camper and clear said top unit in the vertical position.

4. A movable habitable space structure as defined in claim 1 wherein opposed side walls of said bottom unit are each formed to provide a channel, and said top unit has wheels adapted to run in said channels to permit sliding of said top unit over said bottom unit, wherein one pair of wheels is arranged adjacent to the ground when said top unit is disposed vertically, and further including locking means in said bottom unit for locking said one pair of wheels to secure said top and bottom units together.

5. A structure in accordance with claim 1 wherein opposed side walls of the bottom unit include channel means adjacent the upper edges thereof and wherein the top unit is pivotably mounted in line with its center of gravity to cantilever support members mounted within the channel means for translational movement along the channel means.

6. A movable habitable space structure as defined in claim 1 further comprising a flexible waterproof sheet fastened between one end of the open top portion of said bottom unit and the top unit adjacent the other end of the open top portion of the bottom unit when the top unit is in expanded position, and means for retracting the sheet with movement of the top unit over the bottom unit.

7. A habitable space structure capable of being expanded for use and being folded up when not in use, said habitable space structure comprising:
   a box-like structure having side walls which are relatively narrow compared with their length;
   one open end of said box containing rigid folded panels comprising a front roof portion and interconnected side walls and a front wall, capable of being unfolded to provide an enclosed habitable front space;
   the other open end of said box containing rigid folded panels comprising another rear roof portion, a floor portion, and interconnected side walls and a rear wall, capable of being unfolded to provide an enclosed habitable rear space; and
   means for guiding the front and rear walls in translational movement between expanded and folded positions.

8. A habitable space structure as defined in claim 7 wherein said box-like structure is pivotably mounted on top of a vehicle for transport and is rotatable to an upright attitude to provide an expandable habitable space.

9. A structure as in claim 7 further including an additional floor portion pivotably mounted to the box along said one open end, and means for erecting the box and the front and rear roof portions and walls relative to the floor portions.

10. Apparatus in accordance with claim 7 wherein the folded panels comprise opposed pivoted folded roof sections, and respective slidable outer end walls attached to the box by corresponding hinged folding sidewalls expandable out of opposite sides of the box to enclose space on opposite sides of the box.

11. Apparatus in accordance with claim 10 further including means for permitting one of said outer end walls to telescope partially into the associated folding sidewall sections.

12. Apparatus in accordance with claim 10 further including a protective covering affixed to one outer end wall and extending over the portion of said transporting unit exposed by the movement of said transportable unit relative thereto.

13. Apparatus in accordance with claim 12 wherein said covering is retractable into storage means mounted on said transporting unit as said end wall is extended outwardly to encompass the space over said exposed portion.

14. An expandable vehicle structure having partially enclosed a base unit mountable on wheels for transporting;
   a cover unit including a box normally positioned on top of said base unit to complete the enclosure thereof;
   means for sliding and pivoting the cover unit about one end of the base unit through an angle of approximately 90° to a generally vertical position; and
   folded rigid panels forming wall and roof portions normally stored within said box and expandable out of opposite sides of the box to provide an upper wall and roof enclosure over said base unit and an additional space enclosure on the opposite side of the vertical box from the base unit.

15. A structure in accordance with claim 14 wherein the box is shorter than the length of the base unit and wherein the cover unit includes a cover section covering both the box and the further length of the base unit during transport, which cover section is pivotably mounted to the box for use as the floor of said additional space enclosure in the expanded position.

16. A structure in accordance with claim 14 wherein the box is mounted for transport cantilevered to the base unit and extending forwardly of the base unit with a fifth wheel coupling member secured to the extended portion of the box for towing the vehicle as a trailer.

17. Apparatus in accordance with claim 14 wherein the folded roof portion for the base unit unfolds along horizontal fold lines and the wall portions open out with one end wall being slidable outwardly from the cover portion and with folded sidewalll sections being attached thereto to unfold along vertical fold lines, and further including a telescoping section for extending the end wall longitudinally from the unfolded sidewalls.

18. Apparatus in accordance with claim 14 wherein said cover unit further includes a floor section hinged outwardly to provide a supporting base for said expanded enclosure.

19. Apparatus in accordance with claim 18 wherein said floor section constitutes the top of the cover unit when the cover unit is in normal position for transporting on top of the base unit.

20. Apparatus in accordance with claim 19 further including adjustable support members affixed to said floor section for providing support for said floor section in the expanded configuration.

21. Apparatus in accordance with claim 20 further including leveling means attached to said floor section for permitting adjustment of the support members to establish the floor section in a level plane.

22. Apparatus in accordance with claim 14 further comprising means for laterally displacing the cover unit relative to the base unit including a pair of tracks mounted on the base unit and bearing elements connected to the cover unit for traversal along said tracks, the tracks including releasable retension members for securing a pair of said bearing elements to act as pivot members about which the cover unit may be rotated to a vertical position.

23. Appratatus in accordance with claim 22 wherein said tracks comprise means for releasing certain of said bearing elements when the cover unit is moved to the pivoting position to permit rotation of the cover unit to an upright position about the pivoting members.

24. Apparatus in accordance with claim 14 wherein the base unit comprises a modular structure adapted for mounting either as a pickup camper or as a trailer vehicle.

25. Apparatus in accordance with claim 14 further including an additional storage section affixed to the base unit and providing a forwardly extending cantilevered portion for mounting a fifth wheel coupling member for towing as a trailer.

26. Apparatus in accordance with claim 24 further including a passenger pod mounted at the rearward end of said base unit comprising two sections respectively hinged at opposite corners of the base unit for rotation to the sides of the unit to be out of the way when the cover unit is rotated into position for unfolding to an expanded configuration.

27. A habitable space structure capable of being expanded for use and being folded up when not in use, said habitable space structure comprising:
   a box having side walls which are relatively narrow compared with their height and having at least one open end;
   the box further containing folded rigid panels comprising a roof portion, side walls, an end wall, and a floor section capable of being unfolded to provide an enclosed habitable space, the floor section being pivotably mounted to the box and adapted to cover said open end when in the folded position, the end wall being mounted for translational movement between expanded and folded positions and connected to adjacent side wall panels by sliding pivot means.

28. A structure as in claim 27 wherein the end wall is slidable translationally into and out of the box in a vertical attitude generally parallel to the plane of the box opening and extending between extended roof and floor sections.

29. A structure as in claim 28 wherein the side wall panels are pivotably connected between the end wall and the box for extension or retraction relative to the box by translational movement of the end wall.

30. Apparatus in accordance with claim 27 wherein said box is supported from the side wall of a house and is expandable to provide an added room enclosure adjacent said house.

* * * * *